T. P. BARNES.
SUPPORT OR HOLDER FOR DETACHABLE WHEELS OF MOTOR VEHICLES.
APPLICATION FILED FEB. 15, 1917.
1,257,666.
Patented Feb. 26, 1918.
2 SHEETS—SHEET 1.
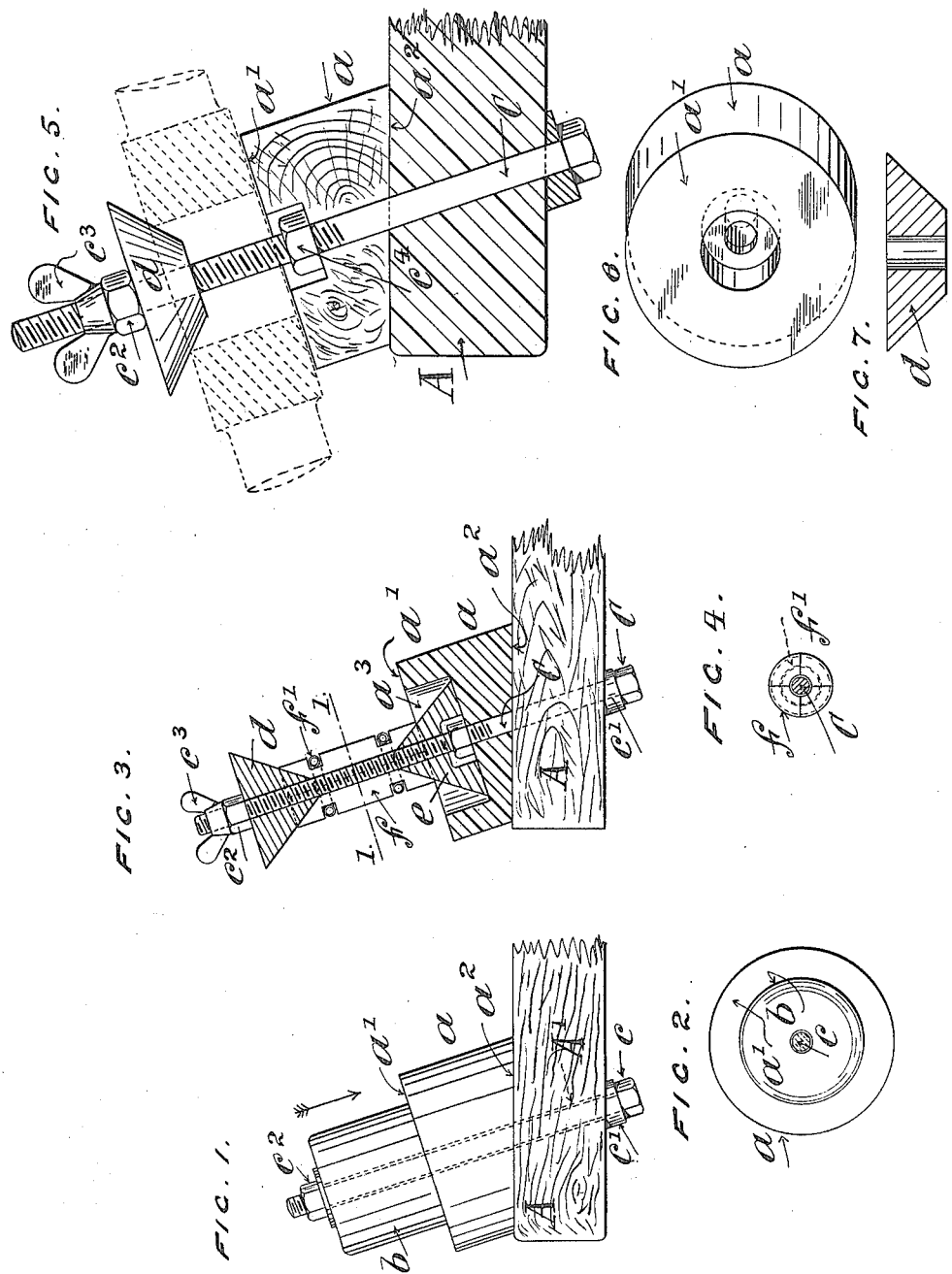

T. P. BARNES.
SUPPORT OR HOLDER FOR DETACHABLE WHEELS OF MOTOR VEHICLES.
APPLICATION FILED FEB. 15, 1917.

1,257,666.

Patented Feb. 26, 1918.
2 SHEETS—SHEET 2.

INVENTOR:
Thomas Peyton Barnes
BY
ATTY.

UNITED STATES PATENT OFFICE.

THOMAS PEYTON BARNES, OF MANCHESTER, ENGLAND.

SUPPORT OR HOLDER FOR DETACHABLE WHEELS OF MOTOR-VEHICLES.

1,257,666.

Specification of Letters Patent.

Patented Feb. 26, 1918.

Application filed February 15, 1917. Serial No. 148,802.

*To all whom it may concern:*

Be it known that I, THOMAS PEYTON BARNES, a subject of the King of Great Britain and Ireland, residing at "Colby," Wilbraham Road, Alexandra Park, Manchester, in the county of Lancaster, England, have invented new and useful Supports or Holders for Detachable Wheels of Motor-Vehicles, of which the following is a specification.

This invention relates to supports or holders for "detachable" wheels of motor vehicles.

I propose to make use of supports or holders for detachable wheels for ease and facility of tire changing.

The changing of tires of "detachable" wheels (when removed from a car) is a considerable labor and as a rule is generally effected with the wheel laid on the floor or upon a bench. Not only is the changing a fatiguing job, but the varnish and paint, &c., frequently suffer damage, unless extreme care is taken.

I provide a readily attachable support and trunnion for a detached wheel which shall not only center the same but shall adequately support it and present the wheel at a suitable angle to the horizontal. I may make the support and trunnion a fixed one, and the trunnion of such size as permits the wheel to freely rotate as required, but the construction is such that any slight further canting of the wheel causes same to bind on the trunnion and the support. The device is made so as to be readily attached to a bench, and fastening means are included to this end.

The device includes a detachable support capable of being fixed to a bench and which support holds the wheel at the desired angle to the horizontal, and a trunnion which centers the wheel at that angle, and the trunnion may be of fixed diameter or such trunnion may be so shaped or made mechanically adjustable or mechanism may be combined with the support which in effect provides an accommodating or adjustable trunnion combined with the support. Holding or clamping devices are included in the combinations as will be seen.

The attached drawings illustrate several forms of device according to my invention, and, in said drawings:—

Figure 1 shows in side elevation the simplest form of device consisting of a support with inclined face or flange, a trunnion, and holding or clamping means.

Fig. 2 is a plan of the complete block shown in Fig. 1 and looking in the direction of the arrow.

Fig. 3 shows a modified form of device with adjustable or expansible trunnion, the view being partly in section.

Fig. 4 is a section on the line 1—1 Fig. 3.

Fig. 5 shows, partly in section, another form of device, the construction giving what amounts to the simplest form of adjustable trunnion in combination with the inclined block.

Fig. 6 is a separate plan view of the inclined block.

Fig. 7 shows a section of the cone seen in Fig. 5.

According to the simplest form of my invention, and as shown by Figs. 1 and 2, I make use of a hard wood or other block $a$ which is suitably turned and which has an annular shoulder or flange $a'$ cut or disposed at an angle to the horizontal. This angle can be simply secured by diagonally cutting the block $a$ at the base, as at $a^2$. Projecting upward from the level of such shoulder or flange $a'$ is the support or trunnion $b$ preferably formed in one with the block and this is suitably turned and is at right-angles to the face of the annular shoulder or flange $a'$. The complete block is bored right through and a long bolt $c$ with inclined washer $c'$ and lock nut $c^2$ or wing-nut is provided. This forms the complete device, and same is applied to a bench A which is bored at A', and is secured firmly by the bolt $c$ as is obvious. The bolt may pass down vertically if desired and in such case an inclined washer is not necessary.

In Fig. 3 I illustrate a form of device with mechanically adjusted or expansible trunnion.

This consists of a wood or other block $a$ with annular shoulder $a'$ inclined to the horizontal. The top of such block is cut away to present a cavity $a^3$ in which is located a cone $e$. I show the block $a$ secured by a bolt C which has an inclined washer $c'$ and a nut $c^4$. The cone $e$ is bored and is slipped on the upwardly extending bolt C, and, around such bolt C, I fit segments $f$ which are cut or machined to a suitable taper top and bottom as shown. Coiled springs $f'$ or other flexible appliances hold the segments around the bolt. A second cone $d$ fits on the upwardly extending bolt C and is held by the lock-nut $c^2$ and wing-nut $c^3$. It is clear, that by adjusting the lock-nut and wing-nut, the segments can be "expanded" so as to produce what amounts to an expansible trunnion. Obviously I may greatly vary the way of providing an expansible trunnion but the example illustrated is the most simple one at present suggesting itself.

Figure 8:
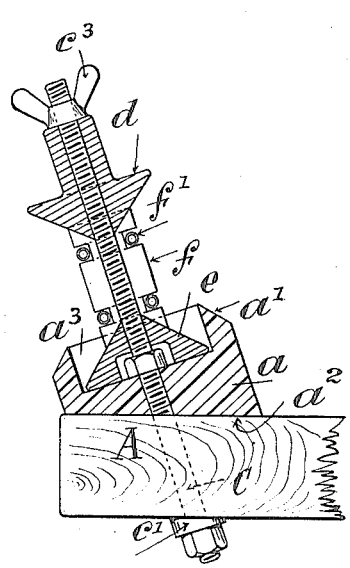
Fig. 8 illustrates a slightly modified construction of device for wheels other than of the plain bored artillery type, the general construction being similar to that shown by Fig. 3.

In Fig. 5, I illustrate another form of device which gives what amounts to an adjustable trunnion in the simplest possible fashion. In this construction I use a block or support $a$ with annular shoulder $a'$ presented at an angle to the horizontal. This block is secured by a long bolt C with nut $c^4$, and inclined washer $c'$, or such like simple device. The upwardly projecting length of screwed bolt is provided with a metal cone $d$ and this is adjusted by the lock-nut $c^2$ and wing-nut $c^3$, or by other ready means. With this construction, any ordinary type of detachable wheel with plain hub or bore can be dealt with, the same being first placed in position and the cone $d$ applied and the nuts $c^2$ and $c^3$ screwed down to a sufficient degree. This done, the wheel is perfectly held and centered and can be rotated as required at an angle to the horizontal. Fig. 8 shows a construction similar to Fig. 3 but in this case the upper cone $d$ has a reduced extension $d^x$ to prevent the obstruction of fitments on certain types of detachable wheels. Also in this case the edge $a'$ of the base block $a$ is chamfered.

Figure 9:
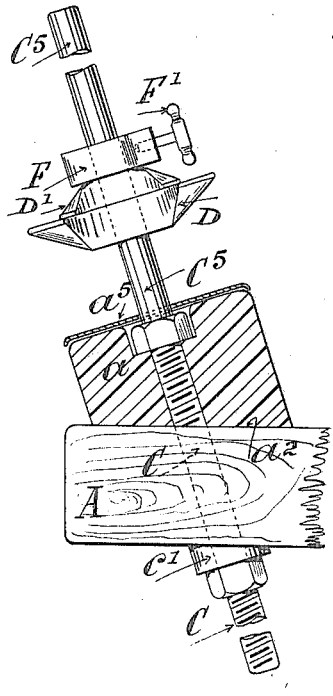
Fig. 9 illustrates a further form of my invention wherein a double and reversible cone forms the expansible trunnion, said cone being held by readily adjustable locking means.
Figure 10:
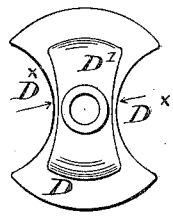
Fig. 10 shows the double reversible cone 85 in plan view.
Figure 11:
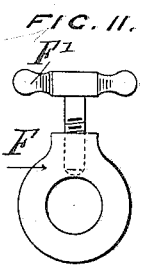
Fig. 11 shows the adjustable locking device.

In the construction shown by Fig. 9 I make use of a double cone device consisting of a large cone D and a smaller cone D' cast together complete. This cone slides on a plain extension $C^5$ of the spindle C, that is, a spindle the upper part of which is without thread. Such cone device is locked in any desired position by the sliding collar F (see Fig. 11) the collar having a pinching screw F'. The cone device has gaps or cut-away portions at $D^x$ to lighten same and to avoid fitments on certain detachable wheels of the self-locking and other types. The wheel when in place, is held between the coned face and a metal plate $a^5$ which prevents scoring of the wooden block, the cone and plate turning readily with the wheel when necessary. The provision of the double cone D D' with cut-away portions not only enables the device to be used readily for the self-locking type of detachable wheel but provides for use with a wider range of size of wheel, because, by simple inversion, either of the two sizes of cone can be utilized according to requirements.

With devices of the kind set forth, a "detachable" wheel can be nicely supported (from the bench) on the trunnion or center thereby provided, and so the wheel is presented in an inclined position. The use of such devices does away with any necessity for lifting or supporting the wheel while the entire tire changing operation takes place and allows the operator the free use of both hands in working the tire "on" or "off". The tire can be got at with the greatest ease on the near side clear of the bench and the wheel freely turned around as occasion requires and locked against further or free rotation at any time by a slight additional tilting or pressure. I may arrange for a fractional clearance between the trunnion or center and the wheel hub. By the inclined disposition, the wheel is more easily dealt with, and in the rear is raised additionally clear of the bench. The use of wheel supports of the kind described greatly reduces the difficulty of tire changing on detachable wheels and prevents damage to the wheel itself or to the paint or varnish, apart from the question of time saving in tire changing operations.

Obviously I may secure the inclined supports or blocks in a variety of ways, but the single bolt makes for simplicity.

I declare that what I claim is—

1. A wheel holder comprising a base, a wedge shaped stationary jaw arranged horizontally on said base, a rod extending through said base and jaw on an angle inclined to the vertical, means for adjusting said rod longitudinally within said base and jaw, and a movable jaw carried by said rod.

2. A wheel holder comprising a rod, a fixed jaw mounted on said rod, a movable jaw slidably mounted on said rod, said movable jaw comprising double frusto-conical portions of different diameters, and means independent of said movable jaw for locking said movable jaw against movement upon said rod in one direction.

In testimony whereof I have signed my name to this specification in the presence of two subscribing witnesses.

THOMAS PEYTON BARNES.

Witnesses:
RICHARD WEBSTER IBBERSON,
ALFRED STUART YATER.